Patented July 11, 1950

2,514,635

UNITED STATES PATENT OFFICE 2,514,635

METHOD OF PREPARING LOWERED VISCOSITY GELATIN

John W. Gates, Jr., and Robert M. Huse, Rochester, N. Y., assignors to Eastman Kodak Company, Rochester, N. Y., a corporation of New Jersey No Drawing. Application July 22, 1949, Serial No. 106,323

6 Claims. (Cl. 260—117)

This invention relates to a method of reducing the viscosity of gelatin by treating it in aqueous solution with a lower alkylamine and a pH regulating salt.

It is commonly recognized that gelatin to be suitable for use in photographic emulsions should have high jelly strength. It has also been recognized that lower viscosity gelatins due to the more readily flowable solutions prepared therewith may be used more easily for coating purposes than the high viscosity gelatins. As substantially all of the viscosity lowering procedures of the prior art lower the jelly strength of the gelatin appreciably, low viscosity photographic gelatins are not common.

One object of our invention is to provide gelatin having a good jelly strength but with a low viscosity. Another object of our invention is to provide a method for lowering the viscosities of gelatins in which the jelly strengths of the gelatins are not appreciably lowered. A further object of our invention is to provide a practical gelatin viscosity lowering method utilizing lower alkylamines. Other objects of our invention will appear herein.

Photographic gelatin manufactured in the conventional manner usually has a viscosity of 9.6–12 cps. Bureau of Standards units and a jelly strength (Bloom) of 225–290. We have found that gelatins having viscosities within the range of 5.2–7.2 cps. but with a jelly strength within the range of 225–290 are obtained by a process of lowering gelatin viscosity as described herein. We have found that by dispersing gelatins having high viscosity and high jelly strength in water, adding thereto a lower alkylamine in an amount sufficient to form an aqueous solution of the amine of a concentration between ½% and 5% and a buffering salt in sufficient amount to adjust the pH to 8.5–10.5 that viscosity lowering of the gelatin occurs with but a small lowering of jelly strength. It is desirable in this operation that the temperature be sufficiently elevated that the gelatin be in solution in the water and that the mass be liquid. Ordinarily it is sufficient if the temperature be above 90° F. and below the boiling temperature of the water, but a range of 90–150° F. is preferred. The minimum temperature will be governed by the viscosity of the gelatin employed, the higher the viscosity, the more heat desirable to give a liquid mass. Only a short time (such as 15 minutes to one hour) is necessary to lower the viscosity of the gelatin from 9.6–12 cps. to 5.2–7.2 cps., the time varying with the degree of viscosity lowering desired. For instance, if a gelatin of very low viscosity is desired, a time up to two hours may be desirable, unless the temperature is comparatively high, such as 180° F.

Of the lower alkylamines, monomethyl amine has been found to be particularly useful for lowering the viscosity of gelatin in accordance with our invention. Other amines such as ethylamine, dimethylamine, or diethylamine are also useful for lowering the viscosity of gelatin by the method described herein. We have found a concentration of 2% of amine to be particularly useful in the method herein described.

We have found that it is necessary in the viscosity lowering operation that the pH be within the range of 8.5–10.5. For the usual viscosity lowering operations a pH within the range of 9–9.6 gives the best results. As the solution of the amine in water is above this pH, the presence of a buffering salt is desirable to impart the desired pH. The buffering salts which we have found to be useful for this purpose are ammonium salts such as ammonium acetate, ammonium citrate, ammonium carbonate, ammonium phosphate or ammonium chloride. Other salts corresponding to these, such as salts of the amines which are employed, may also be used as buffers to adjust the pH to the range of 8.5 to 10.5, preferably 9–9.6.

The gelatin which is employed as the starting material in our process may be any gelatin of good jelly strength and other properties as characterizes those gelatins employed for photographic purposes. The gelatin may be derived from bones, skins, such as calfskins, pigskins, goatskins, etc. or from other parts of the animal body, by the processes ordinarily employed.

The gelatin viscosities which are in centipoises are Bureau of Standards test viscosities. The jelly strengths are Bloom gelometer units. Reference may be had to an article in J. I. & E. C., March 1924, vol. 16, page 310, for a reference to these units. The units in which the viscosities are given represent considerable variation in viscosity from one unit to the next and because of this, users of gelatin have employed scales of measurement having a more graduated scale of viscosity determination. In the Bureau of Standards scale a drop in gelatin viscosity from, for instance, 11 cps. to 6 cps. represents a decided change in flowability of aqueous solutions of the gelatin.

The following examples illustrate the preparation of lower viscosity gelatins by our method:

*Example 1.*—600 parts of a pure bone gelatin having a viscosity of 11,884 centipoises and a jelly strength of 290 units were dispersed in 7500 parts of water and there was then added to the dispersion 600 parts of a 25% aqueous solution of methylamine and 536 parts of 28% ammonium hydroxide. The pH was lowered to 9.5 by the addition of 400 parts of ammonium chloride. The mass was stirred for one-half hour at 140° F. It was then chilled, set, and the mass shredded, washed, and dried. The gelatin obtained was found to have a viscosity of 6.8 centipoises and a jelly strength of 245.

*Example 2.*—100 parts of pigskin gelatin having a viscosity of 10 centipoises and a jelly strength of 292 were dispersed in 840 parts of water at a temperature of 130° F. There was then added to this dispersion 160 parts of 25% aqueous solution of methylamine and sufficient ammonium chloride to lower the pH to 9.3. The mass was maintained at a temperature of 120–130° F. for one-half hour, whereupon it was chilled to set to a jelly. The mass was then shredded, washed, and dried. The resulting gelatin had a viscosity of 6.4 centipoises and a jelly strength of 256.

*Example 3.*—200 parts of pigskin gelatin having a viscosity of 10 centipoises and a jelly strength of 292 were dispersed in 2000 parts of water at a temperature of 110° F. There was then added to this dispersion 160 parts of a 25% aqueous solution of methylamine and sufficient ammonium acetate to lower the pH to 9.5. The mass was maintained at a temperature of 110° F. for one hour whereupon it was chilled to set the mass to a gel. The mass was shredded, washed, and dried. The resulting gelatin had a viscosity of 7 centipoises and a jelly strength of 253.

*Example 4.*—The above example was repeated except that ammonium phosphate was employed as the buffering agent and the pH was lowered to 9.2. The resulting gelatin had a viscosity of 8 centipoises and a jelly strength of 276.

*Example 5.*—100 parts of pigskin gelatin having a viscosity of 10 centipoises and a jelly strength of 292 were dispersed in 900 parts of water at a temperature of 104° F. There was then added to this dispersion 20 parts of diethylamine and sufficient ammonium chloride to lower the pH to 9.5. The mass was maintained at a temperature of 110° F. for one hour whereupon it was chilled to set to a gel and the mass was shredded, washed, and dried. The resulting gelatin had a viscosity of 8 centipoises and a jelly strength of 234.

*Example 6.*—The preceding example was repeated except that monoethylamine was employed instead of diethylamine. The resulting gelatin had a viscosity of 7.5 centipoises and a jelly strength of 214.

What we claim and desire to secure by Letters Patent of the United States is:

1. A method for preparing a lowered viscosity gelatin which comprises treating the gelatin with an aqueous solution of a lower alkylamine at a pH of 8.5–10.5 at a temperature between 90° F. and boiling temperature for a time within the range of ¼–2 hours whereby the viscosity of the gelatin is appreciably reduced without any considerable lowering of the jelly strength thereof.

2. A method for preparing a lowered viscosity gelatin which comprises treating the gelatin with an aqueous solution of a lower alkylamine at a pH of 9–9.6 at a temperature between 90° F. and boiling temperature for a time within the range of ¼–2 hours whereby the viscosity of the gelatin is appreciably reduced without any considerable lowering of the jelly strength thereof.

3. A method for preparing a lowered viscosity gelatin which comprises treating the gelatin with an aqueous solution of methylamine at a pH of 9–9.6 at a temperature between 90° F. and boiling temperature for a time within the range of ¼–2 hours whereby the viscosity of the gelatin is appreciably reduced without any considerable lowering of the jelly strength thereof.

4. A method for preparing a lowered viscosity gelatin which comprises treating the gelatin with an aqueous solution of diethylamine at a pH of 9–9.6 at a temperature between 90° F. and boiling temperature for a time within the range of ¼–2 hours whereby the viscosity of the gelatin is appreciably reduced without any considerable lowering of the jelly strength thereof.

5. A method for preparing a lowered viscosity gelatin which comprises treating the gelatin with an aqueous solution of monoethylamine at a pH of 9–9.6 at a temperature between 90° F. and boiling temperature for a time within the range of ¼–2 hours whereby the viscosity of the gelatin is appreciably reduced without any considerable lowering of the jelly strength thereof.

6. A method for preparing a lowered viscosity gelatin which comprises treating the gelatin with an aqueous solution of a lower alkylamine at a pH of 9–9.6 at a temperature between 90° F. and boiling temperature for a time within the range of ¼–1 hour whereby the viscosity of the gelatin is appreciably reduced without any considerable lowering of the jelly strength thereof.

JOHN W. GATES, Jr.
ROBERT M. HUSE.

No references cited.